United States Patent
Rhoades et al.

(10) Patent No.: US 9,137,490 B2
(45) Date of Patent: Sep. 15, 2015

(54) SYSTEM AND METHOD FOR VIDEO TRANSMISSION SCHEDULING

(75) Inventors: Richard Rhoades, Decatur, TX (US);
Jiaqing Wang, McKinney, TX (US);
Ryan Holomshek, Wylie, TX (US);
James Essary, Allen, TX (US); Billy Garcia, Richardson, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 1344 days.

(21) Appl. No.: 11/786,030

(22) Filed: Apr. 10, 2007

(65) Prior Publication Data
US 2008/0256569 A1 Oct. 16, 2008

(51) Int. Cl.
*H04N 7/16* (2011.01)
*H04N 21/262* (2011.01)
*H04N 21/643* (2011.01)

(52) U.S. Cl.
CPC ........... *H04N 7/16* (2013.01); *H04N 21/26208* (2013.01); *H04N 21/64322* (2013.01)

(58) Field of Classification Search
None
See application file for complete search history.

(56) References Cited

U.S. PATENT DOCUMENTS

| | | | |
|---|---|---|---|
| 5,036,537 A * | 7/1991 | Jeffers et al. | 380/241 |
| 5,416,508 A * | 5/1995 | Sakuma et al. | 725/54 |
| 5,506,904 A | 4/1996 | Sheldrick et al. | |
| 6,157,719 A | 12/2000 | Wasilewski et al. | |
| 6,198,906 B1 * | 3/2001 | Boetje et al. | 455/3.01 |
| 6,442,755 B1 | 8/2002 | Lemmons et al. | |
| 6,766,169 B2 | 7/2004 | Cooper | |
| 6,772,435 B1 | 8/2004 | Thexton et al. | |
| 6,898,762 B2 | 5/2005 | Ellis et al. | |
| 6,993,782 B1 | 1/2006 | Newberry et al. | |
| 7,305,357 B2 | 12/2007 | Hamilton | |
| 7,370,343 B1 * | 5/2008 | Ellis | 725/58 |
| 7,530,085 B2 | 5/2009 | Tsuria et al. | |
| 8,011,012 B2 | 8/2011 | Carle et al. | |
| 2002/0044658 A1 | 4/2002 | Wasilewski et al. | |
| 2003/0018977 A1 | 1/2003 | McKenna | |
| 2003/0126594 A1 | 7/2003 | Tsuria et al. | |
| 2003/0154242 A1 | 8/2003 | Hayes et al. | |
| 2003/0220100 A1 | 11/2003 | McElhatten et al. | |
| 2004/0244058 A1 | 12/2004 | Carlucci et al. | |
| 2004/0250295 A1 | 12/2004 | Lesenne et al. | |
| 2004/0261099 A1 | 12/2004 | Durden et al. | |
| 2005/0251843 A1 | 11/2005 | Walker | |
| 2006/0080198 A1 | 4/2006 | Doyle | |
| 2006/0116918 A1 | 6/2006 | Flora et al. | |
| 2006/0171390 A1 | 8/2006 | La Joie | |

(Continued)

OTHER PUBLICATIONS

Blackout (broadcasting)—Wikipedia, the free encyclopedia, www.wikipedia.org, Feb. 5, 2007, (3 pgs).

(Continued)

*Primary Examiner* — Kunal Langhnoja
(74) *Attorney, Agent, or Firm* — Toler Law Group, PC

(57) ABSTRACT

A systems and methods for video transmission scheduling are provided. A method of video transmission scheduling may include selecting a first video transmission event associated with first content to be blacked out based on a first geographic access restriction. The method may also include selecting a second video transmission event associated with second content to be blacked out based on a second geographic access restriction. The method may further include linking the first video transmission event to the second transmission event to control a blackout of the second content based at least partially on a trigger related to the first content.

29 Claims, 5 Drawing Sheets

(56) References Cited

U.S. PATENT DOCUMENTS

| | | |
|---|---|---|
| 2007/0011702 A1 | 1/2007 | Vaysman |
| 2007/0044133 A1 | 2/2007 | Hodecker |
| 2007/0124750 A1 | 5/2007 | Sisodia et al. |
| 2007/0124760 A1 | 5/2007 | Novak et al. |
| 2007/0157220 A1 | 7/2007 | Cordray et al. |
| 2007/0198839 A1* | 8/2007 | Carle et al. .................. 713/176 |
| 2007/0226765 A1* | 9/2007 | Bahnck et al. ................. 725/63 |
| 2007/0266396 A1 | 11/2007 | Estermann |
| 2007/0291944 A1* | 12/2007 | Wingert et al. .............. 380/258 |
| 2008/0066095 A1 | 3/2008 | Reinoso |
| 2008/0066103 A1* | 3/2008 | Ellis et al. ...................... 725/38 |
| 2008/0163304 A1 | 7/2008 | Ellis |
| 2008/0168487 A1 | 7/2008 | Chow et al. |
| 2008/0256569 A1 | 10/2008 | Rhoades et al. |
| 2009/0064188 A1 | 3/2009 | Ospalik et al. |
| 2009/0119696 A1 | 5/2009 | Chow et al. |
| 2009/0187938 A1 | 7/2009 | de Heer et al. |
| 2010/0083301 A1 | 4/2010 | Swenson |
| 2010/0125865 A1 | 5/2010 | Ospalik et al. |
| 2013/0081074 A1 | 3/2013 | Ospalik et al. |

OTHER PUBLICATIONS

DIRECTV—NFL Sunday Ticket Blackouts—Blackout Rules for Local Team Home Games, www.directv.com (2 pgs).

Syndication exclusivity—Wikipedia, the free encyclopedia,www.wikipedia.org, Jan. 17, 2007, (3 pgs).

Non-Final Office Action for U.S. Appl. No. 12/271,345 received from the United States Patent and Trademark Office (USPTO) mailed Sep. 27, 2011, 22 pages.

Notice of Allowance for U.S. Appl. No. 12/271,345 received from the United States Patent and Trademark Office (USPTO) mailed Feb. 29, 2012, 14 pages.

Requirement for Restriction/Election for U.S. Appl. No. 11/933,502 received from the United States Patent and Trademark Office (USPTO) mailed May 13, 2010, 8 pages.

Non-Final Office Action for U.S. Appl. No. 11/933,502 received from the United States Patent and Trademark Office (USPTO) mailed Jun. 22, 2010, 22 pages.

Final Office Action for U.S. Appl. No. 11/933,502 received from the United States Patent and Trademark Office (USPTO) mailed Dec. 6, 2010, 22 pages.

Non-Final Office Action for U.S. Appl. No. 11/933,502 received from the United States Patent and Trademark Office (USPTO) mailed Jun. 28, 2011, 34 pages.

Final Office Action for U.S. Appl. No. 11/933,502 received from the United States Patent and Trademark Office (USPTO) mailed Oct. 31, 2011, 35 pages.

Requirement for Restriction/Election for U.S. Appl. No. 11/845,240 received from the United States Patent and Trademark Office (USPTO) mailed Feb. 23, 2010, 7 pages.

Non-Final Office Action for U.S. Appl. No. 11/845,240 received from the United States Patent and Trademark Office (USPTO) mailed Jun. 17, 2010, 20 pages.

Non-Final Office Action for U.S. Appl. No. 11/845,240 received from the United States Patent and Trademark Office (USPTO) mailed Dec. 3, 2010, 9 pages.

Non-Final Office Action for U.S. Appl. No. 11/845,240 received from the United States Patent and Trademark Office (USPTO) mailed May 11, 2011, 16 pages.

Final Office Action for U.S. Appl. No. 11/845,240 received from the United States Patent and Trademark Office (USPTO) mailed Oct. 17, 2011, 17 pages.

\* cited by examiner

| 310 Events | Restrictions | Approx. Start/End |
|---|---|---|
| Dodgers @ Mets | Blackout in NY | 05-01-2006--17:00/19:00 |
| Padres @ Cubs | Blackout in CA | 05-01-2006--17:00/19:00 |
| St. Bonaventure @ St. Josephs | Blackout FOXNE, FOXOH, FOXP, FSNY, FXCN | 05-01-2006--17:00/19:00 |
| | | |
| GA Tech @ Duke | Blackout FXCN | 05-01-2006--20:00/23:00 |
| Washington St. @ Arizona | Blackout in NY | 05-01-2006--20:00/23:00 |
| Rays @ Jays | Blackout in CA | 05-01-2006--20:00/23:00 |
| | | |

320 Create Horizontal Link
322 Create Vertical Link
324 Add Event
326 Modify Restrictions
328 Modify Start/End

SYSTEM AND METHOD FOR VIDEO TRANSMISSION SCHEDULING

FIELD OF THE DISCLOSURE

The present disclosure is generally related to systems and methods for video transmission scheduling.

BACKGROUND

Television content providers may purchase rights to show certain programming within particular geographic areas. For example, a first television content provider may purchase rights to show a sporting event within a first geographic area (e.g., a city) and a second television content provider may have rights to show the sporting event in a second geographic area (nationally, except for the city). If the second content provider normally provides programming within the first geographic area, the second content provider may be required to blackout the sporting event within the second geographic area. On particular days, there may be several sporting events or other programs that a single content provider must blackout in different geographic areas. Hence, there is a need for an improved system and method of video transmission scheduling.

DETAILED DESCRIPTION OF THE DRAWINGS

Figure 1:
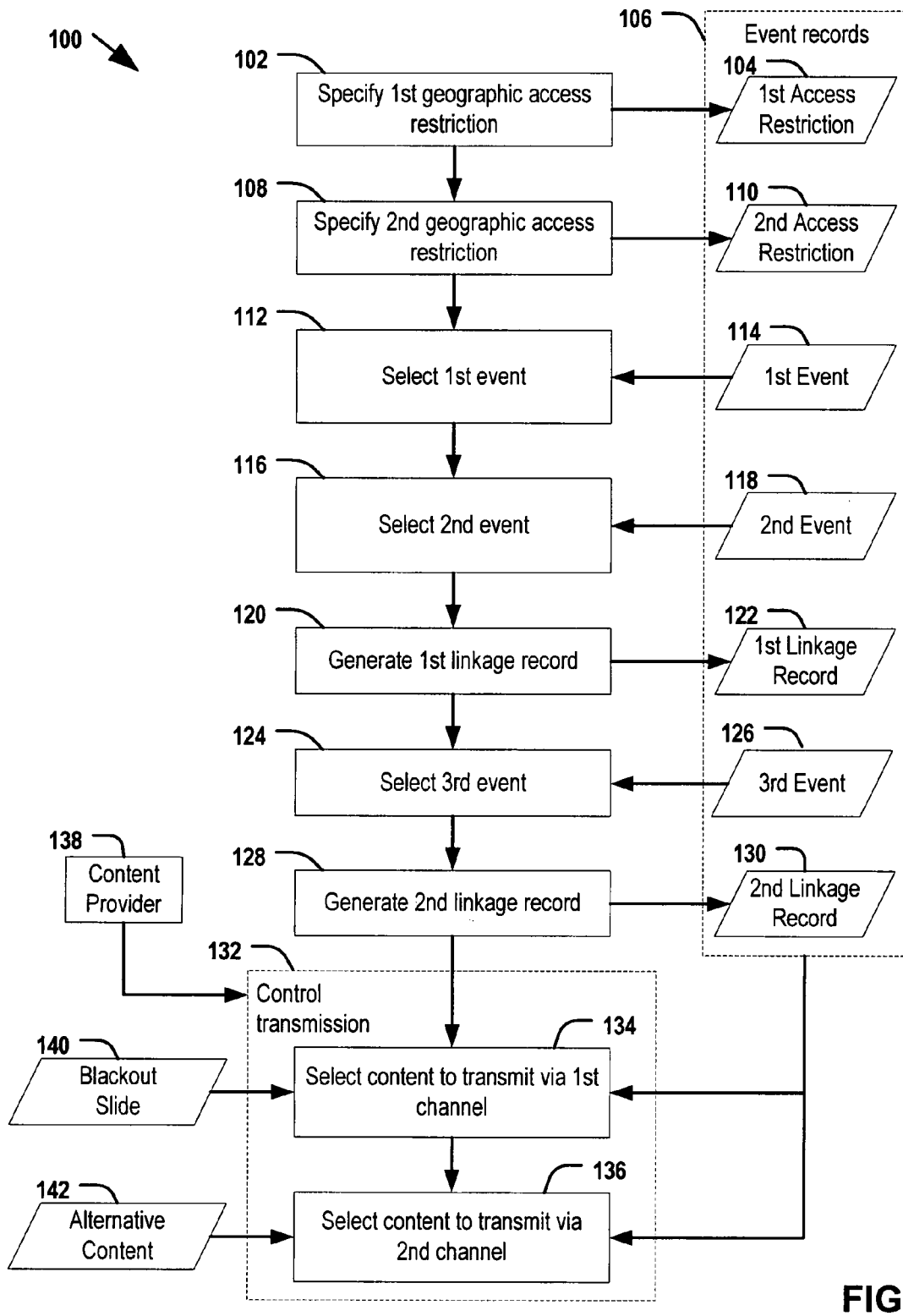
FIG. 1 is flow diagram of a particular embodiment of a system for scheduling video transmissions.

In a particular embodiment, a system to schedule video transmission may include a control interface to receive linking information specifying a link between a first video transmission event and a second video transmission event. The system may also include a memory to store the linking information as a linkage record. The memory may also store a first geographic access restriction associated with the first video transmission event and a second geographic access restriction associated with the second video transmission event.

A method of video transmission scheduling may include selecting a first video transmission event associated with first content to be blacked out based on a first geographic access restriction. The method may also include selecting a second video transmission event associated with second content to be blacked out based on a second geographic access restriction. The method may further include linking the first video transmission event to the second transmission event to control a blackout of the second content based at least partially on a trigger related to the first content.

In a particular embodiment, a method of video transmission scheduling may include selecting a first video transmission event associated with a first geographic access restriction. The method may also include selecting a second video transmission event associated with a second geographic access restriction. The method may also include generating a first linkage record. The first linkage record may specify a link between the first video transmission event and the second video transmission event. The first linkage record may indicate to a video transmission controller to execute an action relative to the second video transmission event based at least partially on a trigger related to the first video transmission event and the first linkage record.

In a particular embodiment, a processor-readable medium may include processor-readable instructions executable by a processor to select a first video transmission event associated with a first geographic access restriction. The processor-readable instructions may also be executable by the processor to select a second video transmission event associated with a second geographic access restriction. The processor-readable instructions may also be executable by the processor to generate a linkage record. The linkage record may specify a link between the first video transmission event and the second video transmission event. In an illustrative embodiment, the linkage record may indicate to a video transmission controller to execute an action relative to the second video transmission event based at least partially on a trigger related to the first video transmission event and the linkage record.

In a particular embodiment, a processor-readable medium may include processor-readable instructions executable by a processor to access a linkage record. The linkage record specifies a link between a first video transmission event and a second video transmission event. The processor-readable instructions may also be executable by the processor to control a blackout of first content associated with the first video transmission event and a blackout of second content associated with the second video transmission event based at least partially on the linkage record.

In a particular embodiment, a display for scheduling video transmission may include a representation of at least one first video transmission event related to a blackout of first content and a representation of at least one second video transmission event related to a blackout of second content. The display may indicate a link between the first video transmission event and the second video transmission event FIG. 1 depicts a particular embodiment of a method of video transmission scheduling, generally designated 100. The method 100 includes, at 102, specifying a first geographic access restriction associated with a first video transmission event as a first access restriction record 104. The method 100 also includes, at 108, specifying a second geographic access restriction associated with a second video transmission event as a second access restriction record 110. In a particular embodiment, the first geographic access restriction record 104 may indicate one or more geographic areas where content associated with a first video transmission event 114 is not to be made available. For example, the content associated with first video transmission event 114 may be subject to a blackout within the one or more geographic areas as identified in the first geographic access restriction record 104. In a particular embodiment, the second access restriction record 110 may indicate that content associated with a second video transmission event 118 is not to be available in one or more geographic areas. For example, the content associated with the second video transmission event 118 may be subject to a blackout within the one or more geographic areas as identified in the second geographic access restriction record 110.

In a particular illustrative embodiment, the first video transmission event 114 or the second video transmission event 118 may include video content associated with at least one sporting event. For example, the first video transmission event 114 may include a first sporting event subject to blackout within particular geographic areas, and the second video transmission event 118 may include a second sporting event subject to blackout within particular geographic areas. In a particular embodiment, the first video transmission event 114 may be associated with a particular content provider, for example a television network, and the second video transmission event 118 may be associated with the same content provider or with a different provider.

The method 100 may also include, at 112, selecting the first video transmission event 114. The method 100 may also include, at 116, selecting the second video transmission event 118. In an illustrative embodiment, the first video transmission event 114 may be associated with video content to be blacked out based on the first geographic access restriction and the second video transmission event 118 may be associated with second video content to be blacked out based on the second geographic access restriction.

In a particular embodiment, the method 100 may also include, at 120, generating a first linkage record 122. The first linkage record 122 may specify a link between the first video transmission event 114 and the second video transmission event 118. The link may indicate to a video transmission control system that when a trigger associated with the first video transmission event 114 is received, an action relative to the second video transmission event 118 should be executed. For example, when an operator sends a trigger indicating an end of a blackout related to the first video transmission event 114, the video transmission control system may automatically end a blackout related to the second video transmission event 118 linked to the first video transmission event 114. In another example, when an operator sends a trigger indicating an end of a blackout related to the first video transmission event 114, the video transmission control system may automatically start a blackout related to the second video transmission event 118 linked to the first video transmission event 114. In a particular illustrative embodiment, the operator may send the trigger associated with the first video transmission event based on observing video content associated with the first video transmission event. For example, the operator may observe a live sporting event associated with the first video transmission event and may send a trigger to the video transmission control system when the live sporting event ends.

In an illustrative embodiment, the first video transmission event 114 and the second video transmission event 118 may be linked beginning-to-beginning. In another illustrative embodiment, the first video transmission event 114 and the second video transmission event 118 may be linked ending-to-ending. When the first video transmission event 114 and the second video transmission event 118 are linked beginning-to-beginning or ending-to-ending, the link may be referred as a vertical link. A vertical link may be useful, for example, when the same video content is to be blacked out on a first channel and a second channel at the same time. To illustrate, where a sporting event is to be blacked out on a first channel associated with a first geographic area and is to be simultaneously blacked out on a second channel associated with the second geographic area, the first linkage record 122 may link the beginning of the blackout period on the first channel and the second channel so that the blackout events begin simultaneously. Similarly, the first linkage record 122 may associate the ending of the blackout period on the first channel and on the second channel so that the blackout events end simultaneously. Additionally, while the first and second transmission events 114, 118 are vertically linked, an operator may observe the content of one of the events, for example, the content associated with the first video transmission event 114, and may send a trigger indicating the end of the content to end the blackout of both the first video transmission event 114 and the second video transmission event 118. That is, continuing the illustration above, when the sporting event is over, the blackout of the sporting event on both channels may be ended simultaneously by the operator sending one trigger indicating the end of the sporting event.

In another illustrative embodiment, the first video transmission event 114 and the second video transmission event 118 may be linked ending-to-beginning. When the first video transmission event 114 and the second video transmission event 118 are linked ending-to-beginning, the link may be referred to as a horizontal link. A horizontal link may be useful, for example, when a first sporting event includes geographic access restrictions on a first channel, and a second, subsequent sporting event includes geographic access restrictions on the same channel. To illustrate, when a live sporting event is to be followed by a second live sporting event on the same channel, the linkage record 122 may specify a horizontal link between the live sporting events. Thus, an operator may observe an ending of the first sporting event, and, send a trigger indicating the end of the first sporting event to end a blackout of the first sporting event, and to automatically begin of the blackout associated with the second event.

The method 100 may also include, at 124, selecting a third video transmission event 126, and, at 128, generating a second linkage record 130. The second linkage record 130 may specify a link between the third video transmission event 126 and at least one of the first video transmission event 114 and the second video transmission event 118. To illustrate, the first video transmission event 114 and second video transmission event 118 may be linked vertically, as previously described. The third video transmission event 126 may be linked horizontally to the first or the second video transmission event 114, 118. For example, the third video transmission event 126 may occur on the same channel and subsequent to the second video transmission event 118, and the third video transmission event 126 may be horizontally linked to the second video transmission event 118. That is, the end of the second video transmission event 118 may be linked to the beginning of the third video transmission event 126. When two or more video transmission events are linked vertically and one or more video transmission events are linked horizontally to one of the vertically linked events, the arrangement may be referred to as compound linking.

In a particular embodiment, the method 100 may include, at 132, controlling transmission of video content. In an illustrative embodiment, controlling transmission of video content may include receiving content from a content provider 138, and, at 134, selecting content to transmit via a first channel based on the first video transmission event 114, the first geographic access restrictions 104 and the first linkage record 122. Controlling transmission of video content may also include, at 136, selecting content to transmit via a second channel based on the second video transmission event 118, the second geographic access restriction 110 and the first linkage record 122. In a particular illustrative embodiment, content provided by the content provider 138 for display via a first channel may be blacked out in particular geographic areas based on the first access restrictions record 104. The first access restrictions record 104 may specify the substitute content to be transmitted via the first channel as a result of the blackout. For example, the substitute content may include a blackout slide 140 to indicate to viewers that particular content is blacked out in their geographic area. In another example, the first access restrictions record 104 may identify alternative content 142 to transmit via the first channel to the particular geographic areas where the first video transmission event 114 is blacked out. The alternative content 142 may include, for example, an alternative sporting event, such as a previously recorded sporting event or another sporting event which the content provider has rights to transmit and which is not restricted from the geographic area in question. In a particular illustrative embodiment, controlling transmission of video content may include accessing event records 206, such as the first access restrictions record 104, the second access restrictions record 110, the first video transmission event 114, the second video transmission event 118, the first linkage record 122, other event records 206, or any combination thereof, to determine content to be transmitted via at least one channel.

Figure 2:
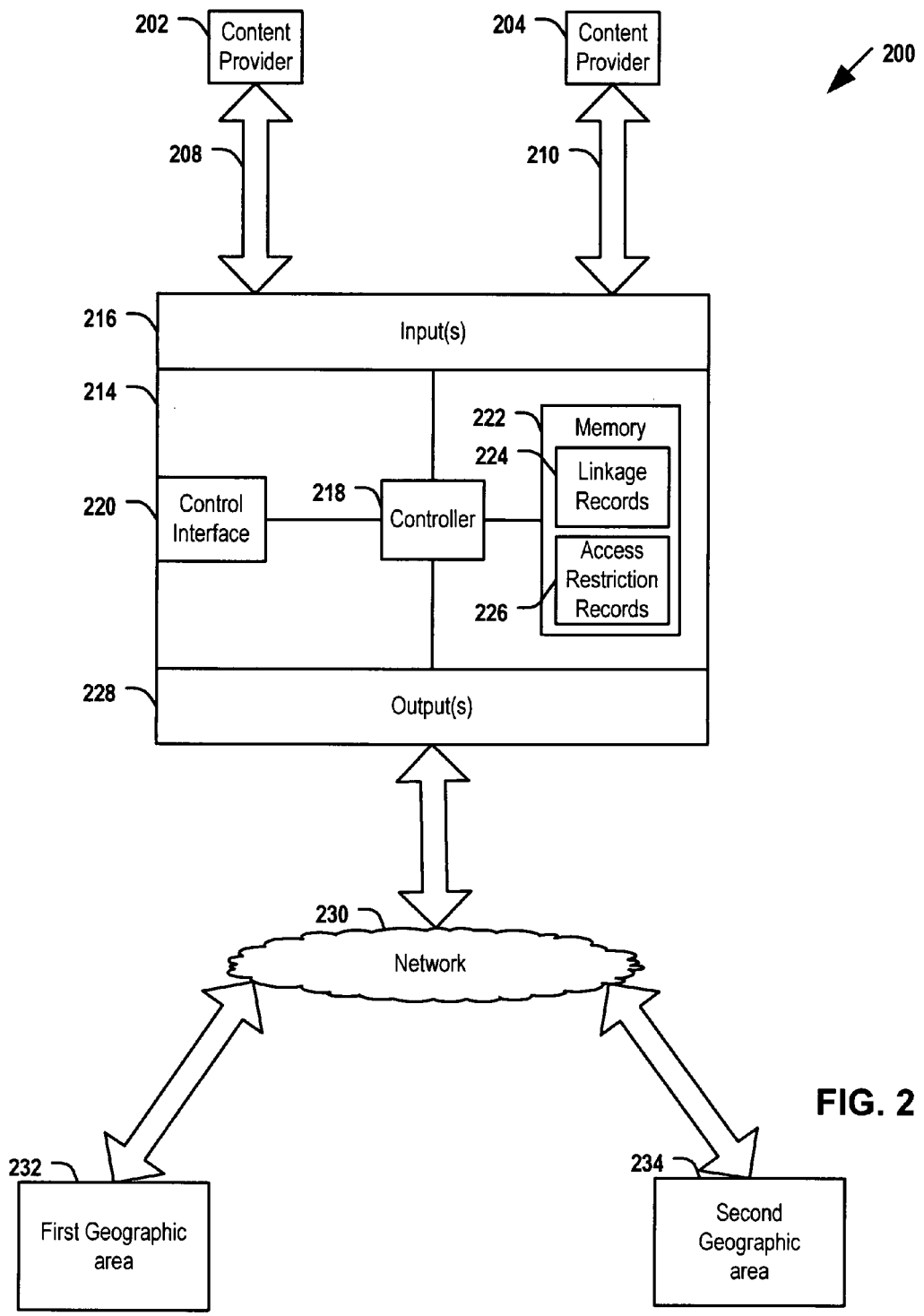
FIG. 2 is a block diagram of a particular embodiment of a system for scheduling video transmissions.

FIG. 2 depicts a particular embodiment of a system to schedule video transmissions, generally designated 200. The system 200 includes a video transmission system 214 receiving video content from a first content provider 202 via a first video feed 208 and from a second content provider 204 via a second video feed 210. The video transmission system 214 selects video content to provide via a plurality of channels to particular geographic areas, such as first geographic area 232 and second geographic area 234. In a particular illustrative embodiment, each channel may be available in each geographic area. For example, the video transmission system 214 may include an Internet Protocol Television (IPTV) national hub office, which provides video content to subscribers nationwide via an IPTV system. In a particular embodiment, the IPTV national hub office may provide video content via multicast. Each IPTV channel may be associated with a particular multicast group. In a particular illustrative embodiment, users or subscribers in each geographic area 232, 234 may be able to access each multicast group, and thus, each channel. However, in particular circumstances certain video content may be associated with geographic access restrictions. For example, the rights to transmit certain live sporting events in a particular geographic area, such as the first geographic area 232, may be purchased by a particular content provider, such as the first content provider 202. A second particular content provider, such as the second content provider 204, may also have rights to broadcast the sporting event in other geographic areas, such as the second geographic area 234. In a particular embodiment, the video transmission system 214 may enable enforcement of the geographic access restrictions by blacking out the restricted access content in the particular geographic areas in which restrictions apply.

In a particular embodiment, the video transmission system 214 may have one or more inputs 216 to receive one or more video feeds 208, 210. The video transmission system 214 may also include one or more outputs 228 to send video content to the first geographic area 232 and the second geographic area 234. In a particular embodiment, the video transmission system 214 may send the video content via a network 230, such as an access network of an IPTV system.

In a particular embodiment, the video transmission system 214 may include a controller 218. The controller 218 may select video content to provide via each channel to each geographic area. In a particular embodiment, the video transmission system 214 may also include a control interface 220. The control interface 220 may receive linking information specifying a relationship between a first end point of a first video transmission event and a second end point of a second video transmission event. In a particular embodiment, the linking information may be stored in a memory 222 as a linkage record 224. The memory 222 may also include an access restriction records 226 specifying geographic access restrictions associated with the first video transmission event and the second video transmission event.

In a particular embodiment, the linkage records 224 may specify a vertical link between the first video transmission event and the second video transmission event. To illustrate, the first video transmission event and second video transmission event may be associated with the same video content presented via different channels at the same time. The vertical link between the first video transmission event and the second video transmission event may indicate that a blackout event associated with the first video transmission event and second video transmission event is to begin and/or end substantially simultaneously on the two channels.

In a particular embodiment, the linkage records 224 may specify a horizontal link between the first video transmission event and the second video transmission event. For example, the first video transmission event and second video transmission event may include content to be presented via the same channel in series, that is, the first video transmission event followed by the second video transmission event. Thus, the linkage record 224 may indicate that an end point of the first video transmission event should initiate the second video transmission event. To illustrate, a blackout of content associated with the second video transmission event should begin when the ending of the content associated with the first video transmission event is indicated.

In a particular embodiment, a control interface 220 may be adapted to receive an indication of the occurrence of an end point associated with a video transmission event. For example, the control interface 220 may receive input from an operator based on the operator's observation of the content associated with the first video transmission event. That is, the operator may observe the video content associated with the first video transmission event and may manually input when an end point of the content associated with the video transmission event has occurred. In a particular embodiment, estimated end points associated with video transmission events may also be stored in the memory 222. In this embodiment, occurrence of an end point of a video transmission event may be indicated by the occurrence of the estimated end point time unless otherwise indicated by an operator via the control interface 220. For example, when it is clear that the end point of the video content associated with the first video transmission event will occur after the estimated end point, the operator at the control interface 220 may modify the estimated end point to indicate the new estimated end time. To illustrate, when a live sporting event goes into overtime, it may be apparent to the operator that the sporting event will not end at the expected time. The operator may enter a new estimated end time via the control interface 220.

In a particular embodiment, the control interface 220 may be adapted to receive input removing a link between two video transmission events. For example, when an end point of a first video transmission event occurs earlier than the expected end point time, a previously specified link between the first video transmission event and the second video transmission event may be removed. This may ensure that a blackout of the second video transmission event does not begin as a result of ending a blackout associated with the first video transmission event.

Figures 3, 4:
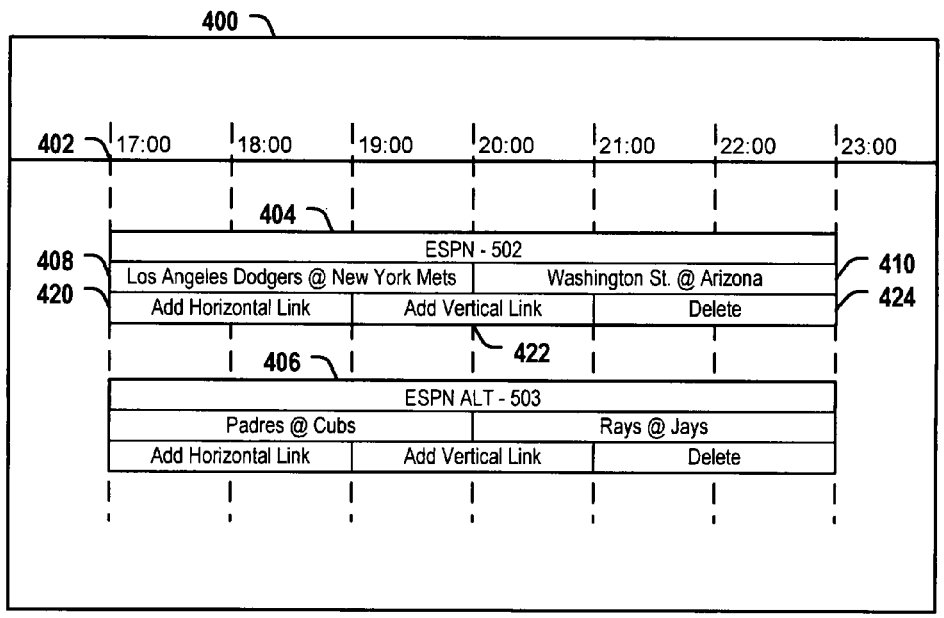
FIG. 3 is an illustration of a first particular embodiment of a user interface display to schedule video transmissions.
FIG. 4 is an illustration of a second particular embodiment of a user interface display to schedule video transmissions.

FIG. 3 depicts a first particular embodiment of a user interface display to schedule video transmissions, generally designated 300. In a particular embodiment, the user interface display 300 may be presented by a video transmission system via a control interface, such as the control interface 220 discussed with reference to FIG. 2. The user interface display 300 includes a plurality of video transmission events 302. Each video transmission event of the plurality of video transmission events 302 is associated with one or more geographic access restrictions 304. The video transmission events 302 may also be associated with approximate start and end times 306. For example, a first video transmission event 310 indicates that a sporting event will occur between the Dodgers and the Mets. The user interface display 300 also indicates that the Dodgers and Mets sporting event should be blacked out in New York, and that the sporting event is expected to last from approximately 17:00 to 19:00 on May 1, 2006.

The user interface display 300 also includes a plurality of user selectable graphics. For example, the user interface display 300 may include a graphic 320 indicating a user selectable option to create a horizontal link between two or more selected video transmission events. In an illustrative embodiment, a horizontal link may be specified when a first video event and the second video event are to be blacked out on the same channel, one following the other. The user interface display 300 may also include a graphic 322 indicating a user selectable option to create a vertical link. In an illustrative embodiment, a vertical link may occur when a particular event is to be blacked out on more than one channel at the same time. In a particular embodiment, the user interface display 300 may also include a graphic 324 indicating a user selectable option to add an event to the plurality of video transmission events 302. In a particular embodiment, the user interface display 300 may also include a graphic 326 indicating a user selectable option to modify restrictions associated with a selected event. The user interface display 300 may also include a graphic 328 indicating a user selectable option to modify an estimated start time or end time associated with an event.

FIG. 4 depicts a second particular embodiment of a user interface display for scheduling video transmissions, generally designated 400. The user interface display 400 includes a time line 402 horizontally. The time line 402 provides a graphic representation of the passage of time, allowing an operator to see the temporal relationship between video transmission events. The user interface display 400 may also include a listing of channels vertically, and an identification of video transmission events associated with particular channels. For example, the user interface display 400 includes a first channel 404 identified as "ESPN-502" and a second channel 406 identified as "ESPN ALT-503." The user interface display 400 may identify links associated with video transmission events based on linkage records. For example, the user interface display 400 includes a first video transmission event 408 identified as "Los Angles Dodgers @ New York Mets" and a second video transmission event 410 identified as "Washington St. @ Arizona." Thus, the user interface display 400 indicates to an operator or user that the first video transmission event 408 and the second video transmission event 410 are horizontally linked. That is, that the first video transmission event 408 is to be blacked out on channel ESPN-502, and that upon the ending of the first video transmission event, the second video transmission event 410 is to be blacked out on channel ESPN-502. That is, when the operator indicates that the Dodger @ Mets sporting event has ended, the blackout of the Washington St. @ Arizona sporting event should begin.

In a particular embodiment, the user interface 400 may include input control features for modifying or adding to the linkage records. For example, the user interface display 400 may include a graphic 420 indicating a user selectable option to add a horizontal link. Thus, via selection of graphic 420, the user may indicate that an additional video transmission event should be horizontally linked before the first video transmission event 408 or after the second video transmission event 410. The user interface display 400 may also include a graphic 422 indicating the user selectable option to add a vertical link. Thus, via selection of graphic 422, the user may indicate that the first video transmission event 408 or the second video transmission event 410 should be simultaneously blacked out on another channel, for example, on ESPN ALT 406.

Figure 5:
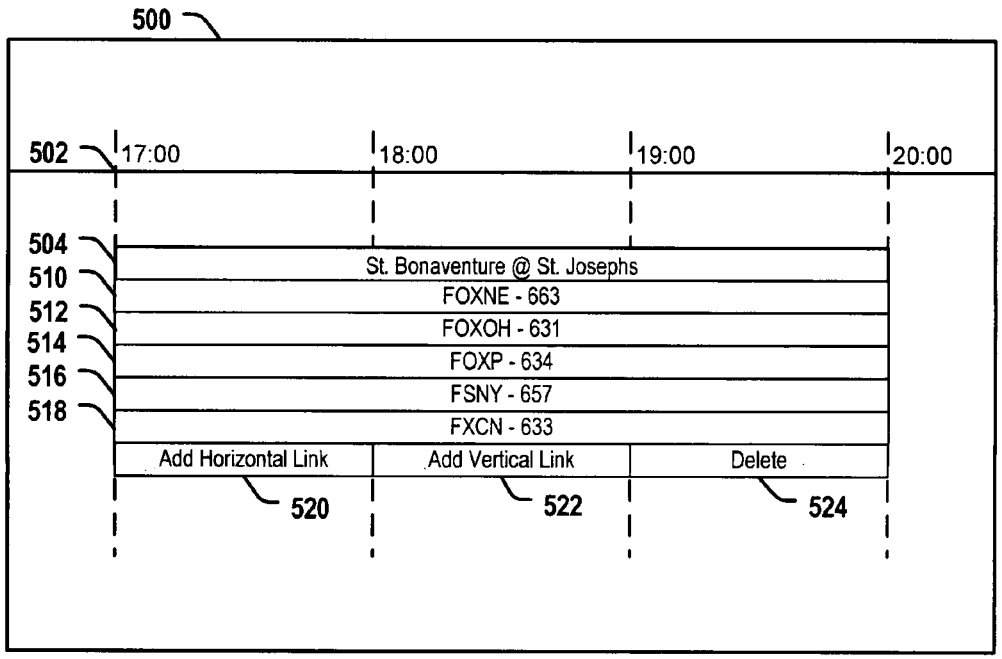
FIG. 5 is an illustration of a third particular embodiment of a user interface display to schedule video transmissions.

FIG. 5 depicts a third particular embodiment of a user interface display for scheduling video transmissions, generally designated 500. The user interface display 500 includes a time line 502 horizontally. The time line 502 provides a graphic representation of the passage of time, allowing an operator to see the temporal relationship between video transmission events. The user interface display 500 may also include a listing of channels vertically, and an identification of video content associated with the channels. For example, the user interface display 500 includes video content 504 identified as "St. Bonaventure @ St. Joseph." The user interface display 500 also includes a plurality of channels on which the video content 504 is to be blacked out. Thus, the user interface display 500 identifies a plurality of vertical links associated with the video content 504. That is, the video transmission event 510 is associated with the video content 504 on channel "663;" the video transmission event 512 is associated with the video content 504 on channel "631;" the video transmission event 514 is associated with the video content 504 on channel "634;" the video transmission event 516 is associated with the video content 504 on channel "657;" and the video transmission event 518 is associated with the video content 504 on channel "633." Hence, the video transmission events 510, 512, 514, 516 and 518 are linked vertically.

In a particular embodiment, the user interface display 500 may also include input control features. For example, the user interface display 500 may include a graphic 520 indicating a user selectable option to add a horizontal link. Selecting add horizontal link option 520 may allow a user to link another video transmission event to link horizontally to one or more of the video transmission events 510-518. The user interface display 500 may also include a graphic 522 indicating a user selectable option to add a vertical link. Selecting add a vertical link option 522 may allow a user to add another video transmission event to the list of video transmission events vertically linked in the user interface display 500. The user interface display 500 may also include a graphic 524 indicating a user selectable option to delete one or more of the links associating the video transmission events 510-518.

Figure 6:
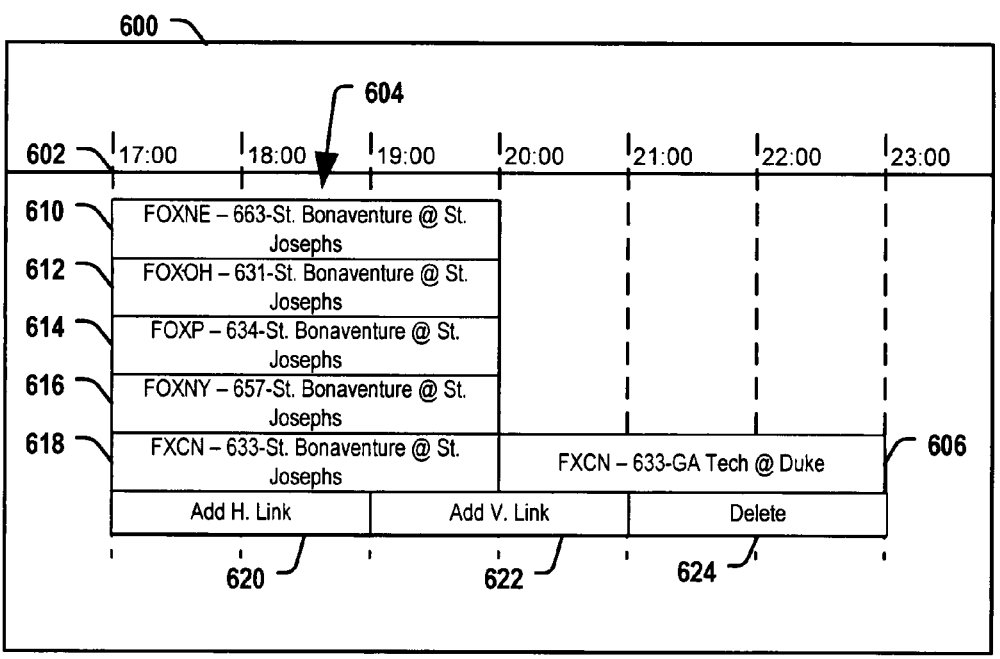
FIG. 6 is an illustration of a fourth particular embodiment of a user interface display to schedule video transmissions.

FIG. 6 depicts a fourth particular embodiment of a user interface display for scheduling video transmissions, generally designated 600. The user interface display depicted in FIG. 6 illustrates compound linking of video transmission events. The user interface display 600 includes a time line 602 graphically illustrating the temporal relationship between video transmission events. The user interface display 600 also includes a plurality of video transmission events linked vertically 604. For example, the user interface display 600 includes a first video transmission event 610 identified as "St. Bonaventure @ St. Josephs" on a channel "FOXNE-663;" a second video transmission event 612 identified as "St. Bonaventure @ St. Josephs" on a channel "FOXOH-631;" a third video transmission event 614 identified as "St. Bonaventure @ St. Josephs" on a channel "FOXP-634;" a fourth video transmission event 616 identified as "St. Bonaventure @ St.

Josephs" on a channel "FOXNY-657;" and a fifth video transmission event 618 identified as "St. Bonaventure @ St. Josephs" on a channel "FXCN-633." The user interface display also includes at least one video transmission event 606 horizontally linked to at least one of the vertically linked video transmission events 618. The horizontally linked video transmission event 606 is identified as "Georgia Tech @ Duke" on channel "FXCN-633" after the "St. Bonaventure @ St. Josephs" event. Thus, the user interface display 600 indicates that the "St. Bonaventure @ St. Josephs" sporting event should be blacked out on channels 663, 631, 634, 657 and 633 simultaneously, and, at the ending of the "St. Bonaventure @ St. Josephs" sporting event the "Georgia Tech @ Duke" sporting event should be blacked out at channel 633.

In a particular embodiment, the vertically linked video transmission events 604 may be controlled substantially simultaneously. That is, an operator may indicate the occurrence of the end of one of these sporting events to trigger an end to the blackout of each of these events on each of these channels. Additionally, the user interface display 600 indicates that when the blackout of the "St. Bonaventure @ St. Josephs" event ends, a blackout of the "Georgia Tech @ Duke" event should begin.

In a particular embodiment, the user interface display 600 may include a plurality of input control features. For example, the user interface display 600 may include a graphic 620 indicating a user selectable option to add a horizontal link. The user interface display 600 may also include a graphic 622 indicating a user selectable option to add a vertical link. The user interface display 600 may also include a graphic 624 indicating a user selectable option to delete at least one link.

In conjunction with the configuration of structure described herein, the systems and methods disclosed schedule video transmission. In a particular illustrative embodiment, a first video transmission event with first geographic access restrictions is selected via a control interface. A second video transmission event with second geographic access restrictions is also selected via the control interface. A first linkage record is generated and stored in a memory. The first linkage record specifies a relationship between at least one first endpoint of the first video transmission event and at least one second endpoint of the second video transmission event.

Figure 7:
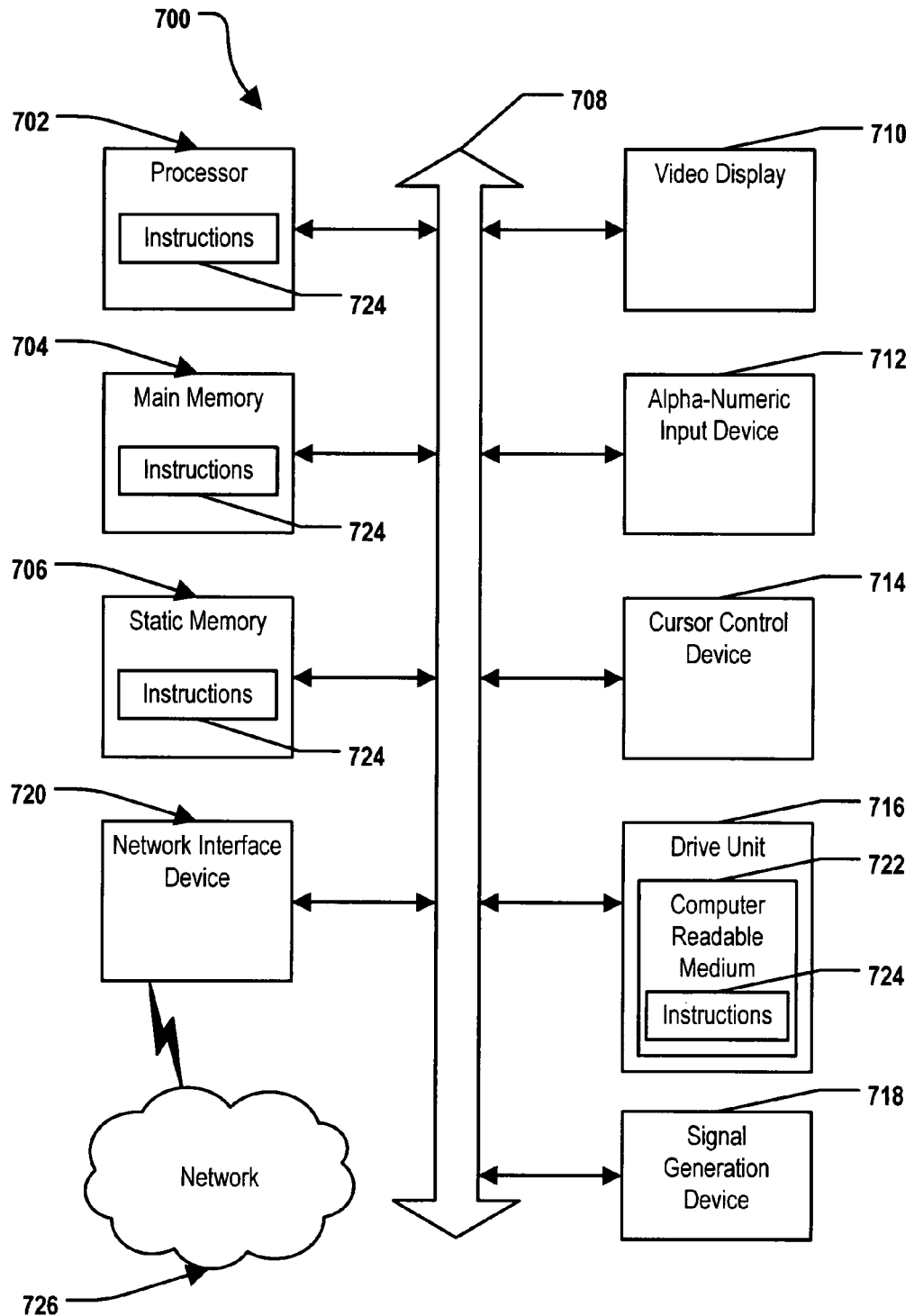
FIG. 7 is a block diagram of an illustrative embodiment of a computer system.

Referring to FIG. 7, an illustrative embodiment of a general computer system is shown and is designated 700. The computer system 700 can include a set of instructions that can be executed to cause the computer system 700 to perform any one or more of the methods or computer based functions disclosed herein. The computer system 700 may operate as a standalone device or may be connected, e.g., using a network, to other computer systems or peripheral devices. For example, the computer system 700 may include or be included in any one or more of the content provider devices, control interfaces, controllers, other video transmission system devices, or other device depicted in and described with reference to FIGS. 1 and 2.

In a networked deployment, the computer system may operate in the capacity of a server or as a client user computer in a server-client user network environment, or as a peer computer system in a peer-to-peer (or distributed) network environment. The computer system 700 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 700 can be implemented using electronic devices that provide voice, video or data communication. Further, while a single computer system 700 is illustrated, the term "system" shall also be taken to include any collection of systems or sub-systems that individually or jointly execute a set, or multiple sets, of instructions to perform one or more computer functions.

As illustrated in FIG. 7, the computer system 700 may include a processor 702, e.g., a central processing unit (CPU), a graphics processing unit (GPU), or both. Moreover, the computer system 700 can include a main memory 704 and a static memory 706, that can communicate with each other via a bus 708. As shown, the computer system 700 may further include a video display unit 710, such as a liquid crystal display (LCD), an organic light emitting diode (OLED), a flat panel display, a solid state display, or a cathode ray tube (CRT). Additionally, the computer system 700 may include an input device 712, such as a keyboard, and a cursor control device 714, such as a mouse. The computer system 700 can also include a disk drive unit 716, a signal generation device 718, such as a speaker or remote control, and a network interface device 720.

In a particular embodiment, as depicted in FIG. 7, the disk drive unit 716 may include a computer-readable medium 722 in which one or more sets of instructions 724, e.g. software, can be embedded. Further, the instructions 724 may embody one or more of the methods or logic as described herein. In a particular embodiment, the instructions 724 may reside completely, or at least partially, within the main memory 704, the static memory 706, and/or within the processor 702 during execution by the computer system 700. The main memory 704 and the processor 702 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 724 or receives and executes instructions 724 responsive to a propagated signal, so that a device connected to a network 726 can communicate voice, video or data over the network 726. Further, the instructions 724 may be transmitted or received over the network 726 via the network interface device 720.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the FIGS. are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of video transmission scheduling, the method comprising:
    selecting, by a processor at a hub office of a television system, a first video transmission event associated with first live content to be restricted based on a first geographic access restriction;
    selecting, by the processor, a second video transmission event associated with second live content to be restricted based on a second geographic access restriction, wherein the second live content is distinct from the first live content;
    selecting, by the processor, a third video transmission event associated with third live content to be restricted based on a third geographic access restriction, wherein the third video transmission event is scheduled to begin subsequent to a previous video transmission event, wherein the previous video transmission event comprises the first video transmission event, the second video transmission event, or a combination thereof;
    creating, by the processor, a vertical link between the first video transmission event and the second video transmission event, the vertical link indicating that application of the first geographic access restriction to the first live content and application of the second geographic access restriction to the second live content are to occur concurrently; and
    creating, by the processor, a horizontal link between the previous video transmission event and the third video transmission event indicating that application of the third geographic access restriction to the third live content is to occur upon completion of application of a previous geographic access restriction to previous live content associated with the previous video transmission event.

2. The method of claim 1, wherein the application of the first geographic access restriction and the application of the second geographic access restriction are to occur concurrently when a trigger is received, the trigger associated with one of the first geographic access restriction and the second geographic access restriction.

3. The method of claim 2, wherein the trigger is received from an operator of a television system associated with the processor based on a determination that a restriction interval associated with the first geographic access restriction and the second geographic access restriction has occurred.

4. The method of claim 1, wherein the vertical link is created based on a determination that a first restriction interval associated with the first geographic access restriction is equal to a second restriction interval associated with the second geographic access restriction, wherein the first live content and second live content have a same scheduled start time, and wherein the first live content and second live content have a same scheduled end time.

5. The method of claim 1, wherein the first live content is a live sporting event, and the second live content is a television program that is not a sporting event.

6. The method of claim 1, further comprising modifying a start time associated with the application of the third geographic access restriction based on a determination that an estimated end time of the previous geographic access restriction is different from a scheduled end time of the previous geographic access restriction.

7. A method of video transmission scheduling, the method comprising:
  selecting, by a processor at a hub office of a television system, a first video transmission event associated with first live content to be restricted based on a first geographic access restriction;
  selecting, by the processor, a second video transmission event associated with second live content to be restricted based on a second geographic access restriction, wherein the second live content is distinct from the first live content;
  selecting, by the processor, a third video transmission event associated with third live content to be restricted based on a third geographic access restriction, wherein the third video transmission event is scheduled to begin subsequent to a previous video transmission event, wherein the previous video transmission event comprises the first video transmission event, the second video transmission event, or a combination thereof;
  creating, by the processor, a vertical link between the first video transmission event and the second video transmission event, the vertical link indicating that application of the first geographic access restriction to the first live content and application of the second geographic access restriction to the second live content are to occur concurrently;
  creating, by the processor, a horizontal link between the previous video transmission event and the third video transmission event indicating that application of the third geographic access restriction to the third live content is to occur upon completion of application of a previous geographic access restriction to previous live content associated with the previous video transmission event;
  in response to creating the vertical link, generating a first linkage record that specifies the vertical link between the first video transmission event and the second video transmission event; and
  in response to creating the horizontal link, generating a second linkage record that specifies the horizontal link between the third video transmission event and the previous video transmission event.

8. The method of claim 7, further comprising:
  selecting the first live content to transmit via a first channel based on the first video transmission event and the first geographic access restriction; and
  selecting the second live content to transmit via a second channel based on the second video transmission event, the second geographic access restriction, and the first linkage record.

9. The method of claim 7, further comprising:
  determining whether an estimated end time of the previous video transmission event is after a scheduled end time of the previous video transmission event; and
  in response to a determination that the estimated end time is after the scheduled end time, modifying the application of the previous geographic access restriction to be completed at the estimated end time.

10. The method of claim 9, wherein application of the third geographic access restriction to the third live content is delayed from a scheduled start time of the third video transmission event to an estimated start time based on the estimated end time.

11. The method of claim 7, wherein the first geographic access restriction indicates a first geographic area where the first live content is to be restricted, and wherein the second geographic access restriction indicates a second geographic area where the second live content is to be restricted.

12. The method of claim 11, wherein the first geographic access restriction identifies first alternative content to be substituted for the first live content in the first geographic area, wherein the second geographic access restriction identifies second alternative content to be substituted for the second live content in the second geographic area, and wherein the first alternative content is distinct from the second alternative content.

13. The method of claim 12, wherein the first alternative content includes a first blackout slide indicating that the first live content is restricted, and wherein the second alternative content includes a second blackout slide indicating that the second live content is restricted.

14. A system for scheduling video transmission, the system comprising:
  a processor; and
  a memory accessible to the processor, the memory including instructions that, when executed by the processor, cause the processor to perform operations including:
    receiving linking information,
    wherein the linking information specifies a vertical link between a first video transmission event associated with first live content to be restricted based on a first geographic access restriction and a second video transmission event associated with second live content to be restricted based on a second geographic access restriction,
    wherein the linking information specifies a horizontal link between a third video transmission event associated third live content to be restricted based on a third geographic access restriction and a previous video transmission event,
    wherein the previous video transmission event comprises the first video transmission event, the second video transmission event, or a combination thereof,
    wherein the second live content is distinct from the first live content,
    wherein the third live content is distinct from the first live content and the second live content, wherein the vertical link indicates that application of the first geographic access restriction to the first live content and application of the second geographic access restriction to the second live content are to occur concurrently; and wherein the horizontal link indicates that application of the third geographic access restriction to the third live content is to occur upon completion of application of a previous geographic access restriction to previous live content associated with the previous video transmission event; and in response to receiving the linking information, storing the linking information as a first linkage record that specifies the vertical link between the first video transmission event and the second video transmission event and as a second linkage record that specifies the horizontal link between the third video transmission event and the previous video transmission event.

15. The system of claim 14, further comprising a controller configured to control transmission of the first video transmission event and the second video transmission event based on the linking information.

16. The system of claim 15, wherein the controller is configured to apply the first geographic access restriction to the first live content and to apply the second geographic access restriction to the second live content concurrently based on the vertical link in the first linkage record.

17. The system of claim 16, wherein the operations further include receiving a trigger that indicates the first live content has ended, wherein, in response to receiving the trigger, the controller is configured to remove the first geographic access restriction applied to the first live content and to remove the second geographic access restriction applied to the second live content, and wherein removal of the first geographic access restriction and the second geographic access restriction occurs concurrently.

18. The system of claim 17, wherein the trigger is received from an operator.

19. The system of claim 14, wherein the processor is associated with an internet protocol television hub office.

20. The system of claim 14, wherein the first video transmission event is associated with a first content provider, and wherein the second video transmission event is associated with a second content provider.

21. A computer-readable storage device including instructions that, when executed by a processor, cause the processor to perform operations including:

selecting, at a hub office of a television system, a first video transmission event associated with first live content to be restricted based on a first geographic access restriction, selecting a second video transmission event associated with second live content to be restricted based on a second geographic access restriction;

selecting a third video transmission event associated with third live content to be restricted based on a third geographic access restriction, wherein the third video transmission event is scheduled to begin subsequent to a previous video transmission event, wherein the previous video transmission event comprises the first video transmission event, the second video transmission event, or a combination thereof;

creating a vertical link between the first video transmission event and the second video transmission event, the vertical link indicating that application of the first geographic access restriction to the first live content and application of the second geographic access restriction to the second live content are to occur concurrently;

creating a horizontal link between the previous video transmission event and the third video transmission event indicating that application of the third geographic access restriction to the third live content is to occur upon completion of application of a previous geographic access restriction to previous live content associated with the previous video transmission event;

generating a linkage record that specifies the vertical link between the first video transmission event and the second video transmission event, and generating a second linkage record that specifies the horizontal link between the third video transmission event and the previous video transmission event.

22. The computer-readable storage device of claim 21, wherein the operations further include:

receiving a trigger that indicates the first live content has ended; and in response to receiving the trigger, removing the first geographic access restriction applied to the first live content and removing the second geographic access restriction applied to the second live content, wherein removing the first geographic access restriction and the second geographic access restriction occurs concurrently.

23. A computer-readable storage device including instructions that, when executed by a processor, cause the processor to perform operations including:

accessing a first linkage record that specifies a vertical link between a first video transmission event associated with first live content to be restricted based on a first geographic access restriction and a second video transmission event associated with second live content to be restricted based on a second geographic access restriction, wherein the vertical link indicates that application of the first geographic access restriction to the first live content and application of the second geographic access restriction to the second live content are to occur concurrently;

accessing a second linkage record that specifies a horizontal link between a third video transmission event associated with third live content to be restricted based on a third geographic access restriction and a previous video transmission event, wherein the previous video transmission event comprises the first video transmission event, the second video transmission event, or a combination thereof, and wherein the horizontal link indicates that application of the third geographic access restriction is to occur upon completion of application of a previous geographic access restriction to previous live content associated with the previous video transmission event;

applying the first geographic access restriction to the first live content associated with the first video transmission event and applying the second geographic access restriction to the second live content associated with the second video transmission event concurrently based at least partially on the vertical link; and applying the third geographic access restriction to the third live content associated with the third video transmission event subsequent to completion of the application of the previous geographic access restriction to the previous live content.

24. The computer-readable storage device of claim 23, wherein the operations further include substituting alternative content for the first live content and the second live content when the first geographic access restriction and the second geographic access restriction are applied concurrently.

25. A display device for scheduling video transmission, the display device comprising:
- a processor; and
- a memory storing instructions that, when executed by the processor, cause the processor to perform operations including:
  - displaying a representation of a first video transmission event associated with first live content to be restricted based on a first geographic access restriction;
  - displaying a representation of a second video transmission event associated with second live content to be restricted based on a second geographic access restriction;
  - displaying a representation of a third video transmission event associated with third live content to be restricted based on a third geographic access restriction;
  - displaying a first selectable graphic configured to create a vertical link between the first video transmission event and the second video transmission event, the vertical link indicating that application of the first geographic access restriction to the first live content and application of the second geographic access restriction to the second live content are to occur concurrently; and
  - displaying a second selectable graphic configured to create a horizontal link between a previous video transmission event and the third video transmission event, the horizontal link indicating that application of the third geographic access restriction to the third live content is to occur upon completion of application of a previous geographic access restriction to previous live content, wherein the previous video transmission event comprises the first video transmission event, the second video transmission event, or a combination thereof.

26. The display device of claim 25, wherein the vertical link is created based on a determination that a first restriction interval associated with the first geographic access restriction is equal to a second restriction interval associated with the second geographic access restriction, and wherein the vertical link includes information that identifies the first restriction interval and the second restriction interval.

27. The display device of claim 26, further comprising an interface to receive input to receive a change to a restriction interval identified in the information.

28. The display device of claim 25, further comprising an interface to receive input to remove the vertical link between the first video transmission event and the second video transmission event.

29. The display device of claim 25, wherein the operations further include:
- displaying a third selectable graphic associated with modification of the first geographic access restriction, the second geographic access restriction, the third geographic access restriction, or a combination thereof; and
- displaying a fourth selectable graphic associated with modification of runtimes associated with the first live content, the second live content, the third live content, or a combination thereof.

* * * * *